US011003950B2

(12) United States Patent
Agarwal et al.

(10) Patent No.: US 11,003,950 B2
(45) Date of Patent: May 11, 2021

(54) SYSTEM AND METHOD TO IDENTIFY ENTITY OF DATA

(71) Applicant: Innoplexus AG, Eschborn (DE)

(72) Inventors: Vatsal Agarwal, Rampur (IN); Vivek Verma, Pune (IN)

(73) Assignee: Innoplexus AG, Eschborn (DE)

( * ) Notice: Subject to any disclaimer, the term of this patent is extended or adjusted under 35 U.S.C. 154(b) by 111 days.

(21) Appl. No.: 16/369,358

(22) Filed: Mar. 29, 2019

(65) Prior Publication Data
US 2020/0311473 A1    Oct. 1, 2020

(51) Int. Cl.
*G06K 9/62* (2006.01)
*G06N 3/04* (2006.01)
*G06F 40/16* (2020.01)
*G06F 40/284* (2020.01)

(52) U.S. Cl.
CPC ........... *G06K 9/6256* (2013.01); *G06F 40/16* (2020.01); *G06F 40/284* (2020.01); *G06K 9/6264* (2013.01); *G06N 3/04* (2013.01)

(58) Field of Classification Search
CPC .. G06K 9/6256; G06K 9/6264; G06F 40/284; G06F 40/16; G06N 3/04
See application file for complete search history.

(56) References Cited

U.S. PATENT DOCUMENTS

| | | | | |
|---|---|---|---|---|
| 9,129,013 | B2* | 9/2015 | Delaney | G06F 40/30 |
| 9,792,277 | B2* | 10/2017 | Srinivasan | G06F 40/30 |
| 9,846,836 | B2* | 12/2017 | Gao | G06N 3/082 |
| 10,417,350 | B1* | 9/2019 | Mohamed | G06F 40/58 |
| 10,558,746 | B2* | 2/2020 | Goulikar | G06F 16/88 |
| 2018/0165554 | A1* | 6/2018 | Zhang | G06K 9/6256 |
| 2019/0303727 | A1* | 10/2019 | Foroughi | G06K 9/6267 |
| 2020/0104359 | A1* | 4/2020 | Patel | G06F 16/313 |

* cited by examiner

*Primary Examiner* — Gregory M Desire
(74) *Attorney, Agent, or Firm* — Ziegler IP Law Group, LLC

(57) ABSTRACT

Disclosed is system comprising data processing arrangement including processors configured to receive sentences from unlabeled training data set; tokenize, using tokenizer module, sentences to obtain tokens; generate character level features for character of tokens of sentences; generate token level feature for each token of the sentences, wherein token level feature of token in sentence is identified using token coordinates of token and token coordinates of tokens neighboring token in sentence; train artificial neural network adapted to identify entities in sentences to determine first trend set, wherein training is based on received sentences, character level features for each character of tokens of sentences and token level feature for tokens of sentences; train the artificial neural network on set of labelled data to determine second trend set; identify, using identifier module, entity in text content, wherein identifier module uses first trend set and second trend set determined by artificial neural network.

13 Claims, 2 Drawing Sheets

SYSTEM AND METHOD TO IDENTIFY ENTITY OF DATA

TECHNICAL FIELD

The present disclosure relates generally to data interpretation; and more specifically, to systems to identify entity in text content. Moreover, the present disclosure relates to methods implemented via aforementioned systems to identify entity in text content. Furthermore, the present disclosure relates to computer readable medium containing program instructions for execution on computer systems, which when executed by a computer, cause the computer to perform aforementioned methods.

BACKGROUND

Nowadays, natural language processing techniques have been used to understand and interpret information stored in documents. However, natural language processing techniques have several limitations associated with identifying entity of the information. The natural language processing techniques incorrectly classify the information. In an example, information relating to cartographer's map, mean average precision, and mean arterial pressure may all be classified as information about maps by the natural language processing technique.

The natural language processing techniques are trained on labelled data set to identify the entity of the information. However, the natural language processing techniques require a large amount of labelled data set for training. Moreover, the labelled data set is required to be prepared by trained professionals such as domain experts which increases a cost associated with identification of entity. Furthermore, preparing of the labelled data set is a time-consuming process. Moreover, natural language processing techniques trained on labelled data set require afresh training on occurrence of new type of entity of the information.

As a result of the limitations associated with natural language processing techniques, a process involved in identifying entity of the information by natural language processing techniques is resource intensive. A processor used for processing the information runs on high computational load which reduces performance of the processor. Moreover, training on large amount of labelled data set makes the process, memory intensive. Moreover, large amount of labelled data set occupies unnecessarily high amount of space in a RAM (Random Access Memory) of the processor resulting in unavailability of RAM for performing other tasks of the processor and further reduces computational speed of the processor.

Therefore, in the light of foregoing discussion, there exists a need to overcome the aforementioned drawbacks associated with identifying entity of the information.

SUMMARY

The present disclosure seeks to provide a system to identify entity in a text content. The present disclosure also seeks to provide a method implemented via a system to identify entity in a text content. The present disclosure also seeks to provide a computer readable medium containing program instructions for execution on a computer system, which when executed by a computer, cause the computer to perform aforementioned method.

The present disclosure seeks to provide a solution to the existing problem of training artificial neural network to identify entity in text content. An aim of the present disclosure is to provide a solution that overcomes at least partially the problems encountered in prior art, and provides accurate and efficient identification of entity of text content.

In one aspect, an embodiment of the present disclosure provides a system comprising:
   a data processing arrangement including one or more processors configured to:
      receive one or more sentences from unlabeled training data set;
      tokenize, using a tokenizer module, the one or more sentences to obtain a plurality of tokens;
      generate a character level features for each character of the plurality of tokens of the one or more sentences, wherein the character level features of each of the character is identified based on demographics of each of the tokens;
      generate a token level feature for each token of the plurality of tokens of the one or more sentences, wherein the token level feature of a given token in a given sentence is identified using token coordinates of the given token and token coordinates of tokens neighboring the given token in the given sentence;
      train an artificial neural network adapted to identify one or more entities in sentences to determine a first trend set, wherein the training is based on the received one or more sentences, the character level features for each character of the plurality of tokens of the one or more sentences and the token level feature for each token of the plurality of tokens of the one or more sentences;
      train the artificial neural network on a set of labelled data to determine a second trend set;
      identify, using an identifier module, an entity in a text content, wherein the identifier module uses the first trend set and the second trend set determined by the artificial neural network.

In another aspect, an embodiment of the present disclosure provides a method implemented via a system comprising:
   a data processing arrangement including one or more processors configured to:
      receive one or more sentences from unlabeled training data set;
      tokenize, using a tokenizer module, the one or more sentences to obtain a plurality of tokens;
      generate a character level features for each character of the plurality of tokens of the one or more sentences, wherein the character level features of each of the character is identified based on demographics of each of the tokens;
      generate a token level feature for each token of the plurality of tokens of the one or more sentences, wherein the token level feature of a given token in a given sentence is identified using token coordinates of the given token and token coordinates of tokens neighboring the given token in the given sentence;
      train an artificial neural network adapted to identify one or more entities in sentences to determine a first trend set, wherein the training is based on the received one or more sentences, the character level features for each character of the plurality of tokens of the one or more sentences and the token level feature for each token of the plurality of tokens of the one or more sentences;
      train the artificial neural network on a set of labelled data to determine a second trend set;

identify, using an identifier module, an entity in a text content, wherein the identifier module uses the first trend set and the second trend set determined by the artificial neural network.

In yet another aspect, an embodiment of the present disclosure provides computer readable medium containing program instructions for execution on a computer system, which when executed by a computer, cause the computer to perform a method, wherein the method is implemented via a system comprising:

a data processing arrangement including one or more processors configured to:
receive one or more sentences from unlabeled training data set;
tokenize, using a tokenizer module, the one or more sentences to obtain a plurality of tokens;
generate a character level features for each character of the plurality of tokens of the one or more sentences, wherein the character level features of each of the character is identified based on demographics of each of the tokens;
generate a token level feature for each token of the plurality of tokens of the one or more sentences, wherein the token level feature of a given token in a given sentence is identified using token coordinates of the given token and token coordinates of tokens neighboring the given token in the given sentence;
train an artificial neural network adapted to identify one or more entities in sentences to determine a first trend set, wherein the training is based on the received one or more sentences, the character level features for each character of the plurality of tokens of the one or more sentences and the token level feature for each token of the plurality of tokens of the one or more sentences;
train the artificial neural network on a set of labelled data to determine a second trend set;
identify, using an identifier module, an entity in a text content, wherein the identifier module uses the first trend set and the second trend set determined by the artificial neural network.

Embodiments of the present disclosure substantially eliminate or at least partially address the aforementioned problems in the prior art, and enables accurate and efficient identification of entity of text content using training of artificial neural network.

Additional aspects, advantages, features and objects of the present disclosure would be made apparent from the drawings and the detailed description of the illustrative embodiments construed in conjunction with the appended claims that follow.

It will be appreciated that features of the present disclosure are susceptible to being combined in various combinations without departing from the scope of the present disclosure as defined by the appended claims.

BRIEF DESCRIPTION OF THE DRAWINGS

The summary above, as well as the following detailed description of illustrative embodiments, is better understood when read in conjunction with the appended drawings. For the purpose of illustrating the present disclosure, exemplary constructions of the disclosure are shown in the drawings. However, the present disclosure is not limited to specific methods and instrumentalities disclosed herein. Moreover, those in the art will understand that the drawings are not to scale. Wherever possible, like elements have been indicated by identical numbers.

Embodiments of the present disclosure will now be described, by way of example only, with reference to the following diagrams wherein.

Figure 1:
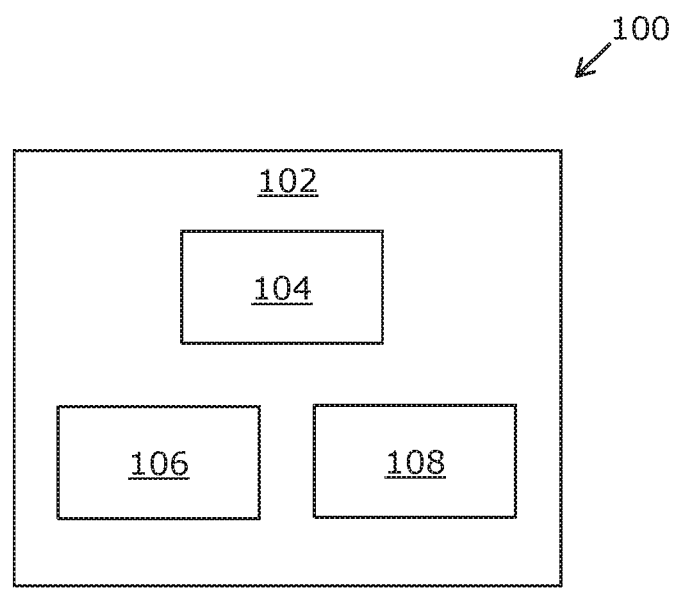
FIG. 1 is a block diagram of a system comprising a data processing arrangement, in accordance with an embodiment of the present disclosure.

In the accompanying drawings, an underlined number is employed to represent an item over which the underlined number is positioned or an item to which the underlined number is adjacent. A non-underlined number relates to an item identified by a line linking the non-underlined number to the item. When a number is non-underlined and accompanied by an associated arrow, the non-underlined number is used to identify a general item at which the arrow is pointing.

DETAILED DESCRIPTION OF EMBODIMENTS

The following detailed description illustrates embodiments of the present disclosure and ways in which they can be implemented. Although some modes of carrying out the present disclosure have been disclosed, those skilled in the art would recognize that other embodiments for carrying out or practicing the present disclosure are also possible.

In one aspect, an embodiment of the present disclosure provides a system comprising:

a data processing arrangement including one or more processors configured to:
receive one or more sentences from unlabeled training data set;
tokenize, using a tokenizer module, the one or more sentences to obtain a plurality of tokens;
generate a character level features for each character of the plurality of tokens of the one or more sentences, wherein the character level features of each of the character is identified based on demographics of each of the tokens;
generate a token level feature for each token of the plurality of tokens of the one or more sentences, wherein the token level feature of a given token in a given sentence is identified using token coordinates of the given token and token coordinates of tokens neighboring the given token in the given sentence;
train an artificial neural network adapted to identify one or more entities in sentences to determine a first trend set, wherein the training is based on the received one or more sentences, the character level features for each character of the plurality of tokens of the one or more sentences and the token level feature for each token of the plurality of tokens of the one or more sentences;
train the artificial neural network on a set of labelled data to determine a second trend set;
identify, using an identifier module, an entity in a text content, wherein the identifier module uses the first trend set and the second trend set determined by the artificial neural network.

In another aspect, an embodiment of the present disclosure provides a method implemented via a system comprising:

a data processing arrangement including one or more processors configured to:
   receive one or more sentences from unlabeled training data set;
   tokenize, using a tokenizer module, the one or more sentences to obtain a plurality of tokens;
   generate a character level features for each character of the plurality of tokens of the one or more sentences, wherein the character level features of each of the character is identified based on demographics of each of the tokens;
   generate a token level feature for each token of the plurality of tokens of the one or more sentences, wherein the token level feature of a given token in a given sentence is identified using token coordinates of the given token and token coordinates of tokens neighboring the given token in the given sentence;
   train an artificial neural network adapted to identify one or more entities in sentences to determine a first trend set, wherein the training is based on the received one or more sentences, the character level features for each character of the plurality of tokens of the one or more sentences and the token level feature for each token of the plurality of tokens of the one or more sentences;
   train the artificial neural network on a set of labelled data to determine a second trend set;
   identify, using an identifier module, an entity in a text content, wherein the identifier module uses the first trend set and the second trend set determined by the artificial neural network.

In yet another aspect, an embodiment of the present disclosure provides computer readable medium containing program instructions for execution on a computer system, which when executed by a computer, cause the computer to perform a method, wherein the method is implemented via a system comprising:

a data processing arrangement including one or more processors configured to:
   receive one or more sentences from unlabeled training data set;
   tokenize, using a tokenizer module, the one or more sentences to obtain a plurality of tokens;
   generate a character level features for each character of the plurality of tokens of the one or more sentences, wherein the character level features of each of the character is identified based on demographics of each of the tokens;
   generate a token level feature for each token of the plurality of tokens of the one or more sentences, wherein the token level feature of a given token in a given sentence is identified using token coordinates of the given token and token coordinates of tokens neighboring the given token in the given sentence;
   train an artificial neural network adapted to identify one or more entities in sentences to determine a first trend set, wherein the training is based on the received one or more sentences, the character level features for each character of the plurality of tokens of the one or more sentences and the token level feature for each token of the plurality of tokens of the one or more sentences;
   train the artificial neural network on a set of labelled data to determine a second trend set;
   identify, using an identifier module, an entity in a text content, wherein the identifier module uses the first trend set and the second trend set determined by the artificial neural network.

The aforesaid system and method provide techniques to identify using an identifier module an entity in a text content. The system efficiently interpret interprets entities from text content stored in the plurality of documents based on the rules determined from the unlabeled and labeled data. Consequently, the system correctly identifies the plurality of entities from plurality of documents based on one or more rules or determined. Beneficially, the system uses unlabeled data to be trained, therefore, the system is enabled various different rules that may not be mentioned in a conventional labeled data set. Thus, the system can conveniently be trained on small amount of labeled data after being trained on a large amount of unlabeled data. Suitably, such arrangement makes the system more time and processes efficient, and subsequently the system uses less resource of the computing system. Beneficially, the system comprising a processor to determine and interpret plurality of entities stored in the plurality of documents requires RAM (Random Access Memory) with less storage space as only small chunk of documents is occupied in the storage space of the RAM. Moreover, the system minimizes the resource consumption of the processor. Consequently, the RAM is available for performing other tasks of the processor and further increases computational speed of the processor. Additionally, the system requires less computing power compared to high computing power required by the existing system. It will be appreciated that, the small chunk of documents retrieved by the system enables the system to display all the retrieved documents on a connected display. Therefore, the system is economical for interpreting plurality of entities.

The present disclosure provides the system comprising the data processing arrangement. The system is a collection of one or more interconnected programmable and/or non-programmable components configured to identify entity, such as terms or words in text content, such as a line, a paragraph and the like. The examples of programmable and/or non-programmable components may include integrated electronic circuits, memories, connectors, cables and the like. Moreover, the programmable components are configured to store and execute one or more computer instructions.

Throughout the present disclosure, the term "data processing arrangement" relates to at least one programmable or computational entity that is configured to acquire process and/or respond to one or more instructions for performing one or more tasks of the aforementioned system. Optionally, the data processing arrangement includes any arrangement of physical or virtual computational units capable of enhancing information to perform various computational tasks. Furthermore, it should be appreciated that the data processing arrangement may be both single hardware server and/or plurality of hardware servers operating in a parallel or distributed architecture. In an example, the data processing arrangement may include components such as memory, a processor, a network adapter and the like, to store, process and/or share information with other computing components, such as user device/user equipment. Optionally, the data processing arrangement is implemented as a computer program implemented as in a computing hardware system such as a computer or a server that provides various services (such as database service) to other devices, modules or apparatus.

The data processing arrangement includes one or more processors. The processor refers to a computational element that is operable to respond and process instructions that drive the system. Optionally, the processor includes, but is not limited to, a microprocessor, a microcontroller, a complex instruction set computing (CISC) microprocessor, a reduced instruction set (RISC) microprocessor, a very long instruction word (VLIW) microprocessor, or any other type of processing circuit. Furthermore, the term "processor" refers to one or more individual processors, processing devices and various elements associated with a processing device that may be shared by other processing devices. Additionally, the one or more individual processors, processing devices and elements are arranged in various architectures for responding to and processing the instructions that drive the system.

Optionally, the system comprises the lexicon ontology represented into the multi-dimensional hierarchical space. Throughout the present disclosure, the term "ontological databank" refers to a data repository that is configured to store information about the plurality of domains, wherein said information is indicative of types of domain, properties of the domains and semantic inter-relationships between the concepts in a specific domain. The term domain refers to a subject matter category of a specific field such as computers, bio-technology, life science, medical science, pharmaceuticals, shopping, sports, finance, entertainment, music, or politics and the like. It will be appreciated that a given domain comprises one or more words relating to concepts, categories, and so forth of the given domain. In an example, the medical science domain may comprise one or more words such as lung cancer, PD1 antibody, treatment, eGFR and the like. In another example, the finance domain may comprise one or more words such as bullying, fixed asset, accrual and the like. Typically, the ontology defines properties associated with the one or more words and relations therebetween in the given domain. Moreover, a semantic inter-relationship between concepts in the specific domain is indicative of a causal relationship between the concepts of the domain that relate two given concepts. Optionally, the ontological databank is configured to store the information about the plurality of domains in a structured manner in a storage unit, such as memory of the ontological.

Optionally, the set of words comprised in the lexicon ontology databank are content words. Typically, 'content words' refer to words that describes objects of actuality and qualities associated therewith. Such as, for example, the content words consist of at least one of: nouns, lexical verbs, adjectives, and adverbs. More optionally, the lexicon ontology databank may include multi-word expressions such as idiomatic expressions, phrasal verbs, jargon expressions, and other common expressions.

The one or more processors are configured to receive one or more sentences from unlabeled training data set. The one or more sentences as used herein refers to one or more words, symbols, term and the like clustered using a set of rule or pattern to convey a particular idea, sentiment or information. Typically, the idea sentiment or information is expressed by the one or more sentences relates to the subject area or the domain. In other words, the one or more sentences conveys a brief description relating to the subject area or the domain. Moreover, receiving the one or more sentences includes executing one or more routine or program in the one or more processors that initiate extraction of the one or more sentences from the unlabeled training data set. The unlabeled training data set refers to a data set stored in a data repository curated from a plurality of information sources. Examples of information source may include various digital objects used to store data, such as web-document, websites, web portals and the like. Furthermore, the data repository storing the unlabeled training data is configured to acquire data one or more local databases or remote databases. It will be local databases refers to a data storage that is curated storage of data that is stored in the one or more hardware component used in the aforementioned system, further the remote databases refer to the data storage that is communicably connected with the one or more hardware component used in the aforementioned system on a subscription basis. Furthermore, acquiring data from remote databases on subscription basis refers to acquiring data from remote databases as an online service that is accessed by the data processing arrangement with subscriber accounts.

Furthermore, the data curated in the data repository includes a set of files in which data is recorded, wherein the data is recorded as a data type. Some examples of various data types are text data, tabular data, image data, and so forth. Thus, the information sources are plurality of documents comprising any suitable file formats depending upon the data type in which the data is recorded. Moreover, the plurality of documents further comprises associated attributes that relate to visual appearance thereof. In an example, the associated attribute may include a structure relating to the plurality of documents such as a layout of the document, a design of the document, and so forth. In another example, the associated attributes may include a format relating to the plurality of documents such as font, color, and image, and so forth. Optionally, each of the plurality of documents adheres to the subject area or a domain associated therewith. More optionally, each of the plurality of documents may be saved as a uniquely named file in one or more databases. Optionally, each of the plurality of documents adheres to a language such as English, German, Chinese and the like, Optionally, the each of the plurality of documents adheres to a language used in describing information in various subject area, domain and so forth, such as computers, bio-technology, life science, medical science, pharmaceuticals and the like.

The one or more processors are configured to tokenize, using a tokenizer module, the one or more sentences to obtain a plurality of tokens. The one or more processors is configured to tokenize, using the tokenizer module, the one or more sentences in each of the plurality of documents to obtain the plurality of tokens for each of the plurality of documents. Typically, the term "tokenize" refers to a process of breaking the one or more sentences into a sequence of strings including linguistic objects. For example, for a given sentence, each word or term in the sentence is categorized as a smaller linguistic object as be considered a token. Additionally, the linguistic objects defined may be words, keywords, phrases, symbols, and so forth. The process of tokenization is performed by a tokenizer module. The tokenizer module includes a collection or set of instructions executable by processing hardware, such the one or more processors to demarcate and classify sections of a string. Moreover, the tokenizer module is configured to tokenize the one or more sentences into lexical token having assigned identified meaning therein. Typically, a given token is a pair consisting of a token name and a token value.

Pursuant to embodiments of the present disclosure, a document (namely, input data) from amongst the plurality of documents is classified into a set of one or more sentences (namely, a sequence of strings). Furthermore, the set of one or more sentences is tokenized into a set of plurality of tokens (namely, linguistic objects). Similarly, each of the documents in the plurality of documents to be compared is tokenized into a corresponding set of plurality of tokens.

Optionally, the tokenizing module identifies tokens based on at least one of: rules pertaining to lexeme, regular expressions, specific sequence of characters of one or more words, specific and separating characters (such as, punctuations, white spaces, and so forth). More optionally, tokens may be made of alphabetic characters, alpha-numeric characters, or numeric characters. In an embodiment, the tokenizing module analyses a punctuation character (such as, a period '.') and white space so as to define tokens. In such case, the punctuation character (namely, the period '.') may denote an abbreviation, a decimal point, an ellipsis, an email-address, or an end of a sentence. In an example, for a sentence, 'Mr. Smith is my neighbor.', the tokenizer module may define the tokens to be 'Mr. Smith', 'is', 'my', 'neighbor'.

The one or more processors are configured to generate the character level features for each character of the plurality of tokens of the one or more sentences. The one or more processors includes a collection or set of instructions executable by processing hardware, such one or more processors segment each of the plurality of tokens into one or more character and analysis each character of the plurality of tokens. Moreover, each token of the plurality of tokens is segmented into the one or more character based on the various structures of the token. For example, a token from amongst the plurality of tokens may be 'oligodendrocytes'. In such instance, the instruction in the one or more processors may be configured to segment the token oligodendrocytes in one or more manner, such as 'oligodendro' and 'cytes'. In another a token from amongst the plurality of tokens may be 'EGFR'. In such instance, the instruction in the one or more processors may be configured to segment the token EGFR into 'E', 'G', 'F', and 'R'.

Moreover, the character level features of each of the character is identified based on demographics of each of the tokens. The demographics of each of the tokens refers to the statistic characteristics associated with the each of the token, specifically statistic characteristics of the characteristics of the one or more characters of the tokens. In an example, the characters 'oligodendro' and 'cytes' of a token 'oligodendrocytes' may have locations, in the multi-dimensional hierarchical space, defined by a set of numbers in Euclidean cartesian coordinate form such as [−0.34, 0.36, 0.311, 0.3553] [−0.68, 0.64, 0.422, 0.6996]. In such example, the location of the characters 'oligodendro' may be close to location of the terms or words related to central nervous system, and the location of the characters 'cytes' may be close to location of the terms or words related to cell in humans, in multi-dimensional hierarchical space.

Optionally, the demographics of each of the tokens may include the form of the each of the characters in the token. For example, form of the characters 'E', 'G', 'F', and 'R' of the token 'EGFR' may describe that the characters are in capital letter. Optionally, the demographics of each of the tokens may include the location of a character with respect to other characters. For example, a character 'L' one or more characters 'a', 'r', 'y', 'n', 'g', 'i', 't', 'i', and 's' of the token 'Laryngitis' may describe that the character is positioned in the stating of the token.

The one or more processors are configured to generate the generate a token level feature for each token of the plurality of tokens of the one or more sentences. The one or more processors includes a collection or set of instructions executable by processing hardware, such the one or more processors to determine features each of the token of the plurality of tokens of the one or more sentences. The features describe the relation of the token in corresponding sentence. The token level feature of a given token in a given sentence is identified using token coordinates of the given token and token coordinates of tokens neighboring the given token in the given sentence. The one or more processors is configured to determine token coordinates of each of the plurality of tokens in the multi-dimensional hierarchical space representing the lexicon ontology. Typically, the token coordinates refer to a location of an object (namely, a token) in the multi-dimensional hierarchical space, wherein the location is specified by a set of numbers, letters, symbols, or a combination thereof. Optionally, the token coordinates of the plurality of tokens are coordinates in the multi-dimensional hierarchical space. Specifically, each word from amongst the set of words in the lexicon ontology databank represented into the multi-dimensional hierarchical space have a defined location. Pursuant to embodiments of the present disclosure, the one or more processors determines location (namely, coordinate) pertaining to each of the token from amongst the plurality of tokens for each of the plurality of documents to be compared. In an example, a token from amongst the plurality of tokens may be 'oligodendrocytes'. In such case, a location of the token in the multi-dimensional hierarchical space (namely, the token coordinate) may be defined by a set of numbers in Euclidean Cartesian coordinate form such as [−0.22, 0.22, 0.221, 0.3443]. In another example, a location of the token in the multi-dimensional hierarchical space may be defined by a combination of numbers and characters in a vector form such as (−0.22x+0.22iy). Furthermore, the locations of the token neighboring a given token in the sentence is identifies. It will be appreciated that locations of the token neighboring a given token is a similar technique, such as by identifying the locations in the multi-dimensional hierarchical space. The location of the tokens neighboring the given token is analyzed to obtain the feature of the token, such as meaning of the token.

The one or more processors are configured to train an artificial neural network adapted to identify one or more entities in sentences to determine a first trend set, wherein the training is based on the received one or more sentences, the character level features for each character of the plurality of tokens of the one or more sentences and the token level feature for each token of the plurality of tokens of the one or more sentences. Throughout the present disclosure, the 'artificial neural network' as used herein refers to a computationally intelligent system that combines knowledge, techniques, and methodologies for controlling the operations of one or more element within a computing environment, namely the data processing arrangement. The artificial neural network in the context of the present disclosure relates to a combination of computing hardware and software-based algorithms that are executable upon computing hardware and are operable to adapt and adjust the operating parameters of the computing hardware in an adaptive manner depending upon data/information, namely the one or more entities in sentences presented to the software-based algorithms when executed upon the computing hardware. Optionally, the artificial neural network is a recurrent neural network. The recurrent neural network is classified according to whether the connecting weight is regarded as a time-variant function or a time-invariant value which is constant during a predetermined time period of the network operations, explained later with greater details. Examples of the artificial neural network includes recursive neural networks, feed-forward neural networks, convolutional neural networks, deep belief networks, and convolutional deep belief networks; self-organizing maps; deep Boltzmann machines; and stacked de-noising auto-encoders.

Moreover, the one or more entities in sentences refers to the one or more linguistic objects in the sentences that refer any object, situation, quality, or action of distinct and independent existence associated to a specific domain. Furthermore, the artificial neural network includes one or more algorithm employing any one or combination of the following computational techniques to identify the one or more entities. Examples of computational techniques may include: constraint program, fuzzy logic, classification, conventional artificial intelligence, symbolic manipulation, fuzzy set theory, evolutionary computation, cybernetics, data mining, approximate reasoning, derivative-free optimization, decision trees, or soft computing.

Furthermore, the artificial neural network is configured to apply knowledge and that can adapt it-self and learn to do better in changing environments, Additionally, employing any computationally intelligent technique, the artificial neural network is operable to adapt to unknown or changing environment for better performance. The artificial neural network includes fuzzy logic engines, decision-making engines, preset targeting accuracy levels, and/or programmatically intelligent software.

Throughout the present disclosure, training the artificial neural network includes determining one or more rules or parameter, that is used by the artificial neural network for operating. Moreover, the knowledge of an event encountered during the operation of the artificial neural network is used in consequent operation of the artificial neural network. The artificial neural network involves unsupervised learning techniques wherein the one or more algorithm automatically categorizes/classifies different behaviors of the one or more linguistic objects in the sentences. Specifically, the one or more sentences employed for training the programmable components using unsupervised learning techniques is neither classified nor labelled. More specifically, unsupervised machine learning algorithms analyze the unlabeled one or more sentences provided for training and further interpret the one or more sentences so as to sort the training data without using predefined labels. Moreover, the unsupervised machine learning algorithms analyses the various distribution of the one or more entities (namely the linguistic objects) in sentences to identify the entities that precede and succeed a given entity.

Furthermore, the artificial neural network is a highly interconnected network of processing elements, each optionally associated with a local memory. In an example, the neural network may be Kohonen map, multi-layer perceptron and so forth. The processing elements can be referred to herein as "artificial neural units", "artificial neurons", "neural units", "neurons", "nodes" and the like, while connections between the processing elements. A neuron can receive data from an input or one or more other neurons, process the data, and send processed data to an output or yet one or more other neurons. The neural network or one or more neurons thereof can be generated in either hardware, software, or a combination of hardware and software, and the neural network can be subsequently trained.

In such instance, the artificial neural units receive the one or more sentences, the character level features for each character of the plurality of tokens of the one or more sentences and the token level feature for each token of the plurality of tokens of the one or more sentences.

Optionally, the one or more algorithms involve a decision tree or network defining decision states concerning whether or not to identify one or more entities in sentences, wherein weightings associated with the decision states are based upon previous experiences derived from the character level features for each character of the plurality of tokens of the one or more sentences and the token level feature for each token of the plurality of tokens of the one or more sentences; optionally, the experiences are aggregated across the one or more sentences, as will be described in greater detail below. The algorithms are operable to migrate between the decision states depending upon content presented to the algorithms, in operation. Moreover, the algorithms are operable to generate new decision states for new types of content that have not previously been provided to the algorithms, as detected using a matching function of the algorithms that compares a given type of content with another type of content. The matching function is optionally based upon a neural network that is trained against different types of content to differentiate between the different types of entities. For performing such a comparison of content, the content is processed to generate metadata, or pseudo-metadata, wherein the matching function is operable to determine a "distance" between the contents being compared, based at least in part upon the metadata or pseudo-metadata. Pseudo-metadata is, for example, a combination of metadata parameters and a portion of the content being compared; for example, the metadata may define that the type of the linguistic objects associated with the entity, the entities that precede and succeed the entity, the characters of the entity, the form of the characters of the entity, the location of the entity when placed in multi-dimensional hierarchical space.

Furthermore, based on the knowledge attained (as mentioned in the aforesaid description) the artificial neural network is operable to determine the first trend set. The first trend set refers to a collection of rules or protocols that are derived from the analysis of the one or more sentences. The rules or protocols of the first trend set may be used to identify various features of the one or more entities in the one or more sentences. For example, the first trend set may include a set of rules or protocols that dictate that the entity having a character 'ices' may refer to a noun that describing a disease.

Optionally, the first trend set comprises one or more distributions of tokens in the one or more sentences of unlabeled training data set. The distributions of tokens in the one or more sentences refers to the placement of tokens. Specifically, the type of tokens that precede and succeed a given token is identified in the unlabeled training data set. Subsequently, the entities that precede and succeed a given token may be identified using the first trend set. In an example, a first event may include receiving sentence from the unlabeled training data set may be 'a disease arthritis includes inflammation in one or more body parts, namely joints in the body'. In such first event, a sequence of strings including linguistic objects in the sentence may be 'a disease arthritis', furthermore the sequence of strings may include the tokens 'a', 'disease', and 'arthritis'. Furthermore, in the first event it may be identified that the token 'disease', including the entity 'disease' is preceded by the token 'a', and succeed by the token 'arthritis' including the entity 'arthritis'. In such example, a second event may include receiving sentence from the unlabeled training data set may be 'inflammation of the mucous membrane is disease, bronchitis'. In such second event, a sequence of strings including linguistic objects in the sentence may be 'disease bronchitis', furthermore the sequence of strings may include the tokens 'disease', and 'bronchitis'. Furthermore, in the first event it may be identified that the token 'disease', including the entity 'disease' is succeed by the token 'bronchitis' including the entity 'bronchitis'. In such example, a third event may include receiving sentence from the unlabeled training data set may be ° the disease hepatitis causes inflammation of the 'liver'. In such third event, a sequence of strings including linguistic objects in the sentence may be ° the disease 'hepatitis', furthermore the sequence of strings may include the tokens 'the', 'disease', and 'hepatitis'. Furthermore, in the first event it may be identified that the token 'disease', including the entity 'disease' is preceded by the token 'the', and succeed by the token 'hepatitis' including the entity 'hepatitis'. In such example, based on the aforesaid three events the artificial neural network may is configured to identify the first trend set including rules that the entities like 'arthritis', 'bronchitis' and 'hepatitis' are illness; and the entities describing illness is preceded by an entity, namely 'disease'. Additionally, the first trend set may include a rule that describes that the entities describing illness like 'arthritis', 'bronchitis' and 'hepatitis' includes character, namely 'itis'.

The one or more processors are configured to train the artificial neural network on a set of labelled data to determine a second trend set. Throughout the present disclosure, the term "set of labelled data" relates to a data set wherein the objects of the data set are identified. Furthermore, the data in the set of labelled data includes tags. In other words, the data in the set of labelled data had undergone the Named Entity Recognition and Classification (NERC). It will be appreciated that, the Named Entity Recognition and Classification is a process of recognizing information units like names, including person, organization and location names, and numeric expressions including time, date, money and percent expressions from unstructured text.

Furthermore, the set of labelled data set refers to a data set stored in a data repository curated from a plurality of information sources. Examples of information source may include various digital objects used to store data, such as web-document, websites, web portals and the like. Furthermore, the data repository storing the set of labelled data set is configured to acquire data one or more local databases or remote databases. It will be local databases refers to a data storage that is curated storage of data that is stored in the one or more hardware component used in the aforementioned system, further the remote databases refer to the data storage that is communicably connected with the one or more hardware component used in the aforementioned system on a subscription basis. Furthermore, acquiring data from remote databases on subscription basis refers to acquiring data from remote databases as an online service that is accessed by the data processing arrangement with subscriber accounts.

Moreover, training the artificial neural network includes determining one or more rules or parameter, that is used by the artificial neural network for operating. Furthermore, extracting one or more operating rules or parameter from the set of labelled data includes extracting knowledge related to information units like names, including person, organization and location names, and numeric expressions including time, date, money and percent expressions Furthermore, training the artificial neural network employs configuring the processing elements using various learning techniques. Optionally, the training the artificial neural network involves semi-supervised training. The term "semi-supervised learning techniques" refers to a learning technique employed by the machine learning algorithms to train the software application using the set of labelled data as well as an unlabeled training dataset. Specifically, the set of labelled data comprises a small corpus of labelled data for supervised learning of the comparison module. Furthermore, the set of labelled data comprises a comparatively smaller amount of data as compared to the unlabeled training data set. Beneficially, semi-supervised learning techniques significantly improves the quality of generated output and reduces training times for the machine learning algorithms. It will be appreciated that the semi-supervised learning techniques comprises an initial supervised learning of the machine learning algorithms using labelled training dataset and eventual unsupervised learning of the machine learning algorithms using unlabeled training dataset. Notably, "supervised learning" refers to a learning technique employed by the machine learning algorithms, wherein the machine learning algorithms predict future outputs by learning from the labelled training datasets provided thereto.

Optionally, the training the artificial neural network involves transfer learning approach. The transfer learning approach refers to a machine learning approach for learning representations of data that uses a model architecture having multiple non-linear transformations. A representation refers to a mathematical construct used to identify or communicate something about a piece of data (e.g., a 'feature' of the data) in a more structured way. For example, the rules or protocols identified can be represented at a 'low level' by a vector of importance of the rule, or at a higher level (e.g., in a more abstract way) as a set of rules or protocols. Furthermore, the transfer learning approach can include generative, discriminative, or hybrid models. Hybrid models include both a generative component and a discriminative component. Different approaches to developing hybrid models include joint methods, iterative methods, and staged methods. Joint methods can optimize a single objective function, which consists of both generative and discriminative energies. Iterative methods train the generative and discriminative models in an iterative manner, so that each model influences the other. In staged methods, the generative and discriminative models are trained separately, with the discriminative model being trained on feature representations learned by the generative model. Classification is performed after the training samples are projected into a fixed-dimensional space induced by the generative model.

Furthermore, the second trend set refers to the rules and protocols that enables the artificial neural network to determine a possibility of an entity to succeed a given entity from a pool of entities. It will be appreciated that the pool of entities includes the entities that are identified from the unlabeled training data set. Optionally, the second trend set comprises probability score for each of the plurality of tokens of the one or more sentences. The second trend set includes one or more rules of identifying the probability score for each of the plurality of tokens. For example, a rule of determining the probability score may be contextual relation of between the plurality of tokens. In an example, a token may have a probability score of 8 and another token probability score of 9. In such a rule in the second trend set may describe that the token with the probability score of 9 is to be preferred.

The one or more processors are configured to identify, using an identifier module, an entity in a text content, wherein the identifier module uses the first trend set and the second trend set determined by the artificial neural network. The identifier module refers to a structure including an arrangement of interconnected programmable and/or non-programmable components that are configured to receive, process and analyze the first trend set and the second trend set to determine the entity in the text content. Moreover, the identifier module includes one or more circuitries comprising one or more electronic components for the identification of entity in the text content. The text content as used herein refers to a sequence of strings including linguistic objects. The sequence of strings including linguistic objects may be a part of the new document including one or more new sentence. Alternatively, the sequence of strings including linguistic objects may be sentences included in the one or more sentences from unlabeled training data set. In an example, the first trend set may include the rules such as, entities describing illness and having the character 'itis', such 'arthritis', 'bronchitis' and/or 'hepatitis' is preceded by tokens including an entity, namely 'disease' and/or 'treatment'. In such example, the possibility of the entity, namely 'disease' to precede the entities such as 'arthritis', 'bronchitis' and/or 'hepatitis' may be defined by a probability score of 9; and the possibility of the entity, namely 'treatment' to precede the entities such 'arthritis', 'bronchitis' and/or 'hepatitis' may be defined by a probability score of 8. In such instance, the one or more circuitries comprising one or more electronic components for the identification of entity in the tokens of the text content such as 'cystitis', 'dermatitis', and/or 'meningitis' as entities related to illness and further suggest entity 'disease' to precede the entities such as 'cystitis', 'dermatitis', and/or 'meningitis'. In an example, the first trend set may include the rules such as, entities describing temperature and having the character 'thermo', such 'thermochemistry', 'thermoelectricity' and/or 'thermomagnetic' is preceded by tokens including an entity, namely 'heat' and/or 'management'. In such example, the possibility of the entity, namely 'heat' to precede the entities such as 'thermochemistry', 'thermoelectricity' and/or 'thermomagnetic' may be defined by a probability score of 9; and the possibility of the entity, namely 'management' to precede the entities such 'thermochemistry', 'thermoelectricity' and/or 'thermomagnetic' may be defined by a probability score of 8. In such instance, the one or more circuitries comprising one or more electronic components for the identification of entity in the tokens of the text content such as 'thermojunction', 'thermostability' and/or 'thermoregulator' as entities related to temperature and further suggest entity 'heat' to precede the entities such as 'thermojunction', 'thermostability' and/or 'thermoregulator'.

Moreover, the present description also relates to the method as described above. The various embodiments and variants disclosed above apply mutatis mutandis to the method.

Optionally, the method further includes a lexicon ontology represented into a multi-dimensional hierarchical space.

Optionally, the token coordinates of the plurality of tokens are coordinates in the multi-dimensional hierarchical space.

Optionally, wherein first trend set comprises one or more distributions of tokens in the one or more sentences of unlabeled training data set.

Optionally, the second trend set comprises probability score for each of the plurality of tokens of the one or more sentences.

Optionally, the training the artificial neural network involves semi-supervised training and transfer learning approach.

Optionally, the artificial neural network is a recurrent neural network.

DETAILED DESCRIPTION OF THE DRAWINGS

Referring to FIG. 1, there is shown a block diagram of a system 100 comprising a data processing arrangement 102, in accordance with an embodiment of the present disclosure. As shown, the data processing arrangement 102 includes one or more processors depicted as a processor 104. Moreover, the data processing arrangement 102 comprises a tokenizer module 106 and an identifier module 108.

FIG. 1 is merely an example, which should not unduly limit the scope of the claims herein. It is to be understood that the simplified illustration of the system 100 for identifying entity of data is provided as an example and is not to be construed as limiting the system 100 to specific numbers, types, or arrangements of the database, and the processing arrangement. A person skilled in the art will recognize many variations, alternatives, and modifications of embodiments of the present disclosure.

Figure 2:
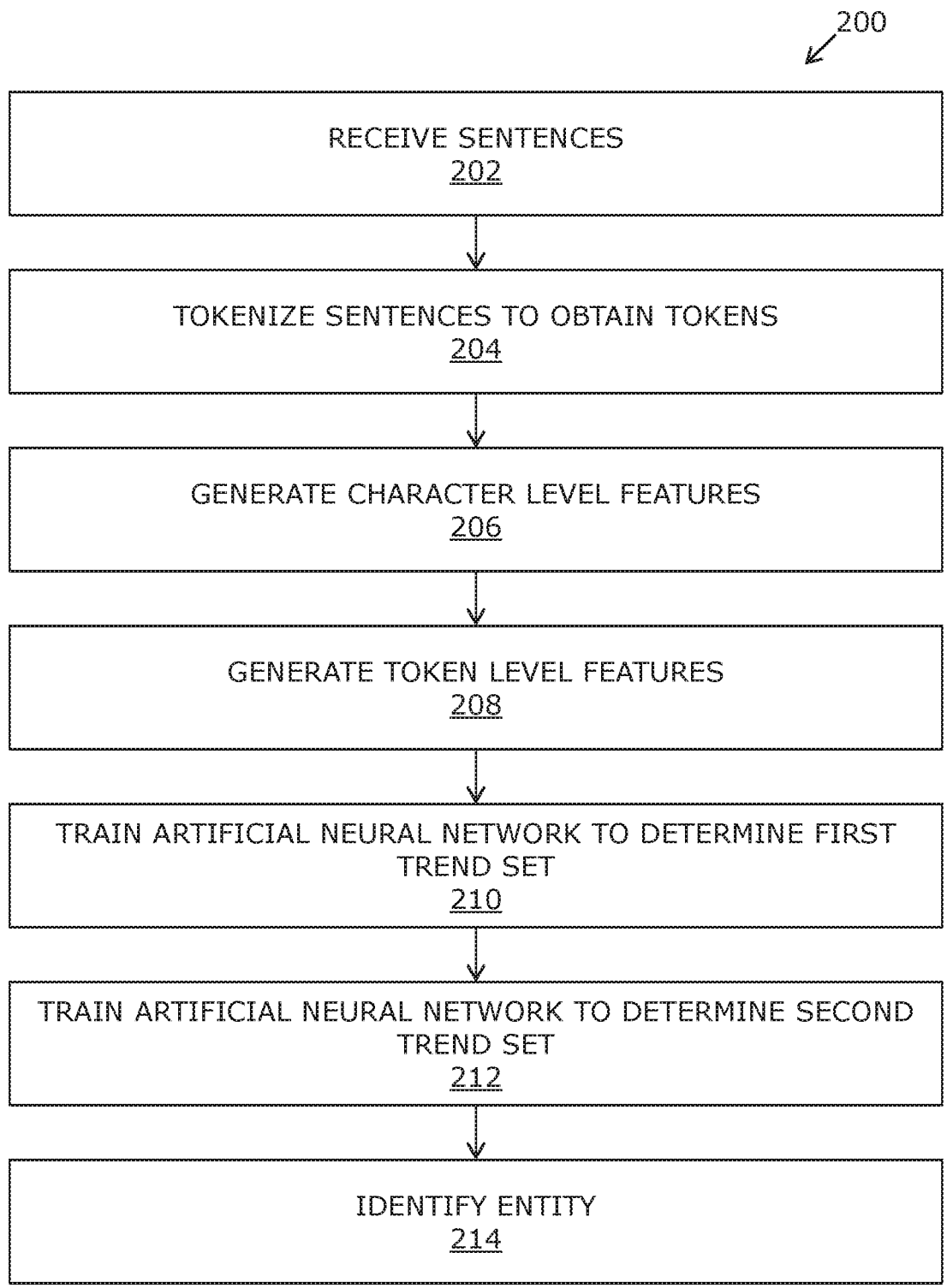
FIG. 2 is an illustration of steps of a method implemented via a system comprising a data processing arrangement, in accordance with an embodiment of the present disclosure.

Referring to FIG. 2, there is shown an illustration of steps of a method 200 implemented via a system comprising a data processing arrangement, in accordance with an embodiment of the present disclosure. At a step 202, one or more sentences are received from unlabeled training data set. At a step 204, the one or more sentences are tokenized using a tokenizer module to obtain a plurality of tokens. At a step 206, character level features are generated for each character of the plurality of tokens of the one or more sentences, wherein the character level features of each of the character is identified based on demographics of each of the tokens. At a step 208, token level feature are generated for each token of the plurality of tokens of the one or more sentences. Moreover, the token level feature of a given token in a given sentence is identified using token coordinates of the given token and token coordinates of tokens neighboring the given token in the given sentence. At a step 210, an artificial neural network adapted to identify one or more entities in sentences is trained to determine a first trend set. Moreover, the training is based on the received one or more sentences, the character level features for each character of the plurality of tokens of the one or more sentences and the token level feature for each token of the plurality of tokens of the one or more sentences. At a step 212, the artificial neural network is trained on a set of labelled data to determine a second trend set. At a step 214, an entity in a text content is identified using an identifier module. Moreover, the identifier module uses the first trend set and the second trend set determined by the artificial neural network.

The steps 202, 204, 206, 208, 210, 212, and 214 are only illustrative and other alternatives can also be provided where one or more steps are added, one or more steps are removed, or one or more steps are provided in a different sequence without departing from the scope of the claims herein.

Modifications to embodiments of the present disclosure described in the foregoing are possible without departing from the scope of the present disclosure as defined by the accompanying claims. Expressions such as "including", "comprising", "incorporating", "have", "is" used to describe and claim the present disclosure are intended to be construed in a non-exclusive manner, namely allowing for items, components or elements not explicitly described also to be present. Reference to the singular is also to be construed to relate to the plural.

What is claimed is:
1. A system comprising:
    a data processing arrangement including one or more processors configured to:
        receive one or more sentences from unlabeled training data set;
        tokenize, using a tokenizer module, the one or more sentences to obtain a plurality of tokens;

generate character level features for each character of the plurality of tokens of the one or more sentences, wherein a given token is divided into a plurality of characters, and wherein the character level features of each of the character is identified based on demographics of each character, wherein the character level features comprise a location of a character in a multi-dimensional hierarchical space;

generate a token level feature for each token of the plurality of tokens of the one or more sentences, wherein the token level feature of a given token in a given sentence is identified using token coordinates of the given token and token coordinates of tokens neighboring the given token in the given sentence, wherein token coordinates of a token represent a location of the token in the multi-dimensional hierarchical space;

train an artificial neural network configured to identify one or more entities in sentences to determine a first trend set, wherein the training is based on the received one or more sentences, the character level features for each character of the plurality of tokens of the one or more sentences and the token level feature for each token of the plurality of tokens of the one or more sentences;

train the artificial neural network on a set of labelled data to determine a second trend set;

identify, using an identifier module, an entity in a text content, wherein the identifier module uses the first trend set and the second trend set determined by the artificial neural network.

2. The system of claim 1, wherein the system further includes a lexicon ontology represented into a multi-dimensional hierarchical space.

3. The system of claim 1, wherein first trend set comprises one or more distributions of tokens in the one or more sentences of unlabeled training data set.

4. The system of claim 1, wherein the second trend set comprises probability score for each of the plurality of tokens of the one or more sentences.

5. The system of claim 1, wherein the training the artificial neural network involves semi-supervised training and transfer learning approach.

6. The system of claim 5, wherein the artificial neural network is a recurrent neural network.

7. A method implemented via a system comprising:
a data processing arrangement including one or more processors configured to:
receive one or more sentences from unlabeled training data set;
tokenize, using a tokenizes module, the one or more sentences to obtain a plurality of tokens;
generate character level features for each character of the plurality of tokens of the one or more sentences, wherein a given token is divided into a plurality of characters, and wherein the character level features of each of the character is identified based on demographics of each character, wherein the character level features comprise a location of a character in a multi-dimensional hierarchical space;
generate a token level feature for each token of the plurality of tokens of the one or more sentences, wherein the token level feature of a given token in a given sentence is identified using token coordinates of the given token and token coordinates of tokens neighboring the given token in the given sentence, wherein token coordinated of a token represent a location of the token in the multi-dimensional hierarchical space;
train an artificial neural network adapted to identify one or more entities in sentences to determine a first trend set, wherein the training is based on the received one or more sentences, the character level features for each character of the plurality of tokens of the one or more sentences and the token level feature for each token of the plurality of tokens of the one or more sentences;
train the artificial neural network on a set of labelled data to determine a second trend set;
identify, using an identifier module, an entity in a text content, wherein the identifier module uses the first trend set and the second trend set determined by the artificial neural network.

8. The method of claim 7, wherein the method further includes a lexicon ontology represented into a multi-dimensional hierarchical space.

9. The method of claim 7, wherein first trend set comprises one or more distributions of tokens in the one or more sentences of unlabeled training data set.

10. The method of claim 7, wherein the second trend set comprises probability score for each of the plurality of tokens of the one or more sentences.

11. The method of claim 7, wherein the training the artificial neural network involves semi-supervised training and transfer learning approach.

12. The method of claim 11, wherein the artificial neural network is a recurrent neural network.

13. A non-transitory computer readable storage medium containing program instructions for execution on a computer, which when executed by the computer, cause the computer to perform a method, wherein the method is implemented via a system comprising:
a data processing arrangement including one or more processors configured to:
receive one or more sentences from unlabeled training data set;
tokenize, using a tokenizer module, the one or more sentences to obtain a plurality of tokens;
generate character level features for each character of the plurality of tokens of the one or more sentences, wherein a given token is divided into a plurality of characters, and wherein the character level features of each of the character is identified based on demographics of each character, wherein the character level features comprise a location of a character in a multi-dimensional hierarchical space;
generate a token level feature for each token of the plurality of tokens of the one or more sentences, wherein the token level feature of a given token in a given sentence is identified using token coordinates of the given token and token coordinates of tokens neighboring the given token in the given sentence, wherein token coordinated of a token represent a location of the token in the multi-dimensional hierarchical space;
train an artificial neural network adapted to identify one or more entities in sentences to determine a first trend set, wherein the training is based on the received one or more sentences, the character level features for each character of the plurality of tokens of the one or more sentences and the token level feature for each token of the plurality of tokens of the one or more sentences;

train the artificial neural network on a set of labelled data to determine a second trend set;

identify, using an identifier module, an entity in a text content, wherein the identifier module uses the first trend set and the second trend set determined by the artificial neural network.

\* \* \* \* \*